United States Patent [19]
Shiota

[11] Patent Number: 6,122,076
[45] Date of Patent: Sep. 19, 2000

[54] IMAGE REPRODUCING METHOD AND APPARATUS INCLUDING COMPRESSING A DYNAMIC RANGE OF A READ-OUT IMAGE SIGNAL

[75] Inventor: Kazuo Shiota, Kanagawa-ken, Japan

[73] Assignee: Fuji Photo Film Co, Ltd., Kanagawa-ken, Japan

[21] Appl. No.: 08/672,939

[22] Filed: Jun. 28, 1996

[30] Foreign Application Priority Data

Jun. 30, 1995 [JP] Japan .................................. 7-165965

[51] Int. Cl.⁷ ...................................................... H04N 1/40
[52] U.S. Cl. ........................ 358/447; 358/462; 358/463; 358/500; 358/1.9
[58] Field of Search .................................... 395/109, 108, 395/114; 358/447, 454, 456, 461, 462, 463, 444, 500, 520, 445, 464, 465, 466; 382/266, 270

[56] References Cited

U.S. PATENT DOCUMENTS

| | | |
|---|---|---|
| 4,239,385 | 12/1980 | Hujer . |
| 4,394,089 | 7/1983 | McIntosh et al. . |
| 4,794,531 | 12/1988 | Morishita et al. ....................... 358/447 |
| 4,845,550 | 7/1989 | Urabe et al. ............................. 358/447 |
| 4,908,876 | 3/1990 | Deforest et al. ........................ 382/266 |
| 4,918,534 | 4/1990 | Lam et al. ............................... 348/336 |
| 4,972,256 | 11/1990 | Hirosawa et al. ....................... 358/487 |
| 5,012,333 | 4/1991 | Lee et al. ................................ 358/520 |
| 5,051,842 | 9/1991 | Shimazaki ............................... 358/447 |
| 5,191,439 | 3/1993 | Sumi ....................................... 358/447 |
| 5,214,294 | 5/1993 | Toyofuku ................................ 250/561 |
| 5,223,951 | 6/1993 | Umakoshi ............................... 358/447 |
| 5,317,427 | 5/1994 | Ichikawa ................................. 358/447 |
| 5,438,429 | 8/1995 | Haeberli et al. ........................ 358/445 |
| 5,471,987 | 12/1995 | Nakazawa et al. ................. 364/413.13 |
| 5,493,622 | 2/1996 | Tsuchino et al. . |

FOREIGN PATENT DOCUMENTS

| | | |
|---|---|---|
| 0 327 107 | 8/1989 | European Pat. Off. . |
| 0 440 166 A2 | 8/1991 | European Pat. Off. . |
| 0 482 712 A2 | 4/1992 | European Pat. Off. . |
| 2 549 327 | 1/1985 | France . |
| 58-66929 | 4/1983 | Japan . |
| 6410819 | 2/1989 | Japan . |
| 6435542 | 2/1989 | Japan . |
| 6242521 | 9/1994 | Japan . |
| 6-292009 | 10/1994 | Japan . |

Primary Examiner—Edward L. Coles
Assistant Examiner—Mark Wallerson

[57] ABSTRACT

In reproducing a visible image from a digital image signal representing a color image, the digital image signal being made up of a series of image signal components, an unsharp image signal, which represents an unsharp image of the color image, is formed. The image signal components of the digital image signal and the unsharp image signal, which image signal components represent corresponding picture elements in the color image and the unsharp image, are coupled with one another, and a compressed signal having a compressed dynamic range as compared to the original digital image signal is thereby obtained. Predetermined image processing is carried out on the compressed signal, and a processed image signal is thereby obtained. A visible image is reproduced from the processed image signal.

12 Claims, 7 Drawing Sheets

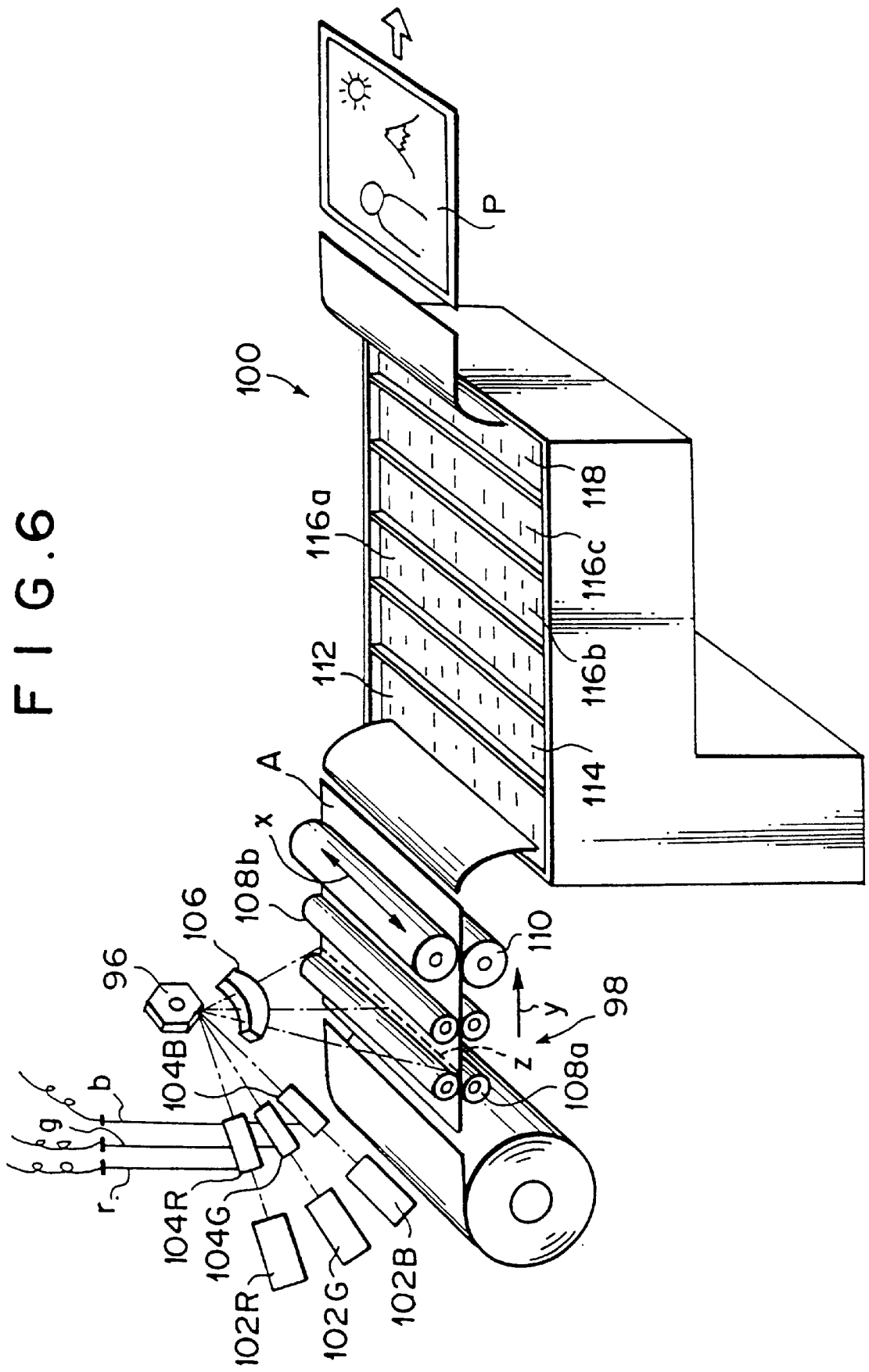

IMAGE REPRODUCING METHOD AND APPARATUS INCLUDING COMPRESSING A DYNAMIC RANGE OF A READ-OUT IMAGE SIGNAL

BACKGROUND OF THE INVENTION

1. Field of the Invention

This invention relates to an image reproducing method and apparatus for reproducing a visible image from an image signal, which is obtained from a color image carried on a reflection type of image storage sheet, such as a photograph or printed matter, or a transmission type of image storage sheet, such as negative film or reversal film.

2. Description of the Prior Art

Recently, research of digital photo printers has been carried out. With the digital photo printers, an image having been recorded on photographic film (hereinbelow referred to as the film), such as negative film or reversal film, or on printed matter is photoelectrically read out, and an image signal having thus been obtained is converted into a digital signal. The digital signal is then subjected to various kinds of image processing, and a processed image signal is thereby obtained. Thereafter, recording light is modulated with the processed image signal, and a photosensitive material, such as photographic paper, is scanned with and exposed to the modulated recording light. In this manner, a visible image is printed on the photosensitive material.

With the digital photo printers, layouts of printed images, such as combining of a plurality of images, division of an image, and editing of characters and images, and various kinds of image processing, such as color/density adjustment, conversion of magnification, and contour emphasis, can be carried out freely. Therefore, prints having been edited and processed freely in accordance with applications of the prints can be obtained. Also, in cases where the conventional surface exposure techniques are employed, the image density information having been recorded on film, or the like, cannot be reproduced perfectly due to limitation imposed upon the reproducible density range of photosensitive materials. However, with the digital photo printers, prints can be obtained such that the image density information having been recorded on film, or the like, can be reproduced approximately perfectly.

Basically, the digital photo printers are constituted of a read-out means for reading out an image having been recorded on an image storage sheet, such as film, and an image reproducing means. The image reproducing means carries out image processing on the image signal having thus been detected by the read-out means, and adjusts exposure conditions. Also, the image reproducing means carries out a scanning exposure operation on a photosensitive material under the adjusted exposure conditions and carries out development processing on the exposed photosensitive material. Further, the image reproducing means can reproduce a visible image from the image signal having been obtained from the image processing and can display the visible image on a monitor.

For example, in a read-out apparatus for reading out an image having been recorded on film, or the like, wherein slit scanning is carried out, reading light having a slit-like shape extending in a one-dimensional direction is irradiated to the film, and the film is moved in a direction, which is approximately normal to the one-dimensional direction. (Alternatively, the reading light and a photoelectric converting device are moved in the direction, which is approximately normal to the one-dimensional direction.) In this manner, the film is scanned in two-dimensional directions. An image of the light, which has passed through the film and carries the film image information, is formed on a light receiving face of the photoelectric converting device, such as a CCD line sensor, and is thus photoelectrically converted into a light amount signal. The thus detected light amount signal is amplified and is then converted into a digital signal by an analog-to-digital converter. Thereafter, the digital signal is subjected to various kinds of image processing, such as compensation for a fluctuation in the characteristics among the CCD elements of the CCD line sensor, density conversion, and conversion of magnification, and a processed signal obtained from the image processing is transferred to a reproducing means.

In the reproducing means, for example, a visible image is reproduced from the received image signal and displayed on a display device, such as a cathode ray tube (CRT) display device. When necessary, the operator, who views the reproduced image, corrects the gradation, the color, the density, or the like, of the reproduced image (i.e., sets the set-up conditions). In cases where the reproduced image is judged as being acceptable as a finished print, the image signal is transferred as the recording image information into a development means or a monitor.

In an image reproducing apparatus, in which the image reproduction with raster scanning (i.e., light beam scanning) is utilized, three kinds of light beams corresponding to exposure of the layers, which are formed on a photosensitive material and are sensitive to three primary colors, e.g. red (R), green (G), and blue (B), are modulated in accordance with the recording image information and deflected in a main scanning direction (which corresponds to the aforesaid one-dimensional direction). Also, the photosensitive material is conveyed in a sub-scanning direction, which is approximately normal to the main scanning direction. (The photosensitive material is thus moved with respect to the deflected light beams and in the sub-scanning direction.) In this manner, the photosensitive material is scanned in two-dimensional directions with the light beams, which have been modulated in accordance with the recording image information, and the image having been read out from the film is thereby reproduced on the photosensitive material.

The photosensitive material having thus been scanned with and exposed to the light beams is then subjected to development processing in accordance with the kind of the photosensitive material. For example, in cases where the photosensitive material is a silver halide photographic material, it is subjected to the development processing comprising the steps of color development, bleach-fix, washing, drying, and the like. A finished print is thereby obtained.

Such a photosensitive material can record a comparatively wide range of luminance of the object. However, the maximum density on the photosensitive material is limited. Therefore, in cases where a print of a scene having a large difference in luminance is obtained with an ordinary printing technique, details become imperceptible due to insufficient gradation in either one of a bright portion (a highlight) and a dark portion (a shadow) on the print. For example, in cases where a picture of a person is taken against the light, if the picture is printed such that the image of the person may become clear, the bright portion, such as the sky region, will become white and its details will become imperceptible. Also, if the picture is printed such that the bright portion, such as the sky region, may become clear, the image of the person will become black and its details will become imperceptible. In order to solve the problems, a shutting light technique or a masking print technique has heretofore been employed.

With the shutting light technique, an ordinary level of exposure is given to a region having an intermediate level of density in a scene. Also, a long time of exposure is given selectively to a region, which is considered to become white and the details of which are considered to become imperceptible on the print, by using a perforated blocking sheet. Further, as for a region, which is considered to become black and the details of which are considered to become imperceptible on the print, the exposure time is kept short selectively by using a blocking sheet. In this manner, the print is obtained such that the contrast of each object may be kept appropriate, and the details of the highlight and the shadow may be kept perceptible. A method has been proposed, in which unsharp image film having been photographically formed by the negative-positive reversal of original image film is used as a blocking sheet for locally controlling the exposure time, and in which the printing is carried out by superposing the original image film and the unsharp image film one upon the other.

Also, various masking print techniques have been proposed in, for example, Japanese Unexamined Patent Publication Nos. 58(1983)-66929 and 64(1989)-35542 and Japanese Patent Publication No. 64(1989)-10819. With the proposed masking print techniques, the same effects as those of the shutting light technique can be obtained by locally changing the brightness of a light source for illuminating a photographic original image.

With the apparatus proposed in Japanese Unexamined Patent Publication No. 58(1983)-66929, a CRT is employed as the illuminating light source, and a photometric operation with memory scanning is carried out on an original image. In this manner, an unsharp mask signal is formed from the color original image. In an exposure mode, a CRT is controlled with the unsharp mask signal, and the contrast is thereby controlled such that the original image may be reliably recorded within the contrast reproduction limit of a photosensitive material.

With the apparatus proposed in Japanese Unexamined Patent Publication No. 64(1989)-35542, a CRT is employed as the illuminating light source, and an optical path for the photometric operation carried out on an original image and an optical path for the exposure of a photosensitive material are provided such that they may be changed over to each other. Also, a signal for controlling the luminance of the CRT during the exposure and thereby correcting the gradation and the saturation of the reproduced image is formed in accordance with the photometric signal obtained from the original image. Further, a signal for displaying the reproduced image on a monitor is formed. The image displayed on the monitor is viewed, and the amount of light of the CRT is thereby controlled such that a desired image may be reproduced.

With the apparatus proposed in Japanese Patent Publication No. 64(1989)-10819, a matrix device, such as a liquid crystal, which is capable of locally changing the light transmittance, is located between a uniform surface light source and an original image. The transmittance of the liquid crystal is controlled in accordance with the photometric signal obtained from the original image, and the contrast of the reproduced image is thereby adjusted.

Further, for example, in Japanese Unexamined Patent Publication No. 6(1994)-242521, a method is proposed wherein, in order for the gray balance in image reproduction to be corrected, conversion is carried out such that the maximum density value and the minimum density value of each color on an original image may become equal to predetermined values on the reproduced image. With the proposed method, the control of the gradation can be carried out for each of the frames of film. Therefore, as for a scene having a large difference in luminance, the gradation of the entire area of the image can be rendered soft such that the range of luminance of the scene may fall within the dynamic range of the photosensitive material. In this manner, the problems can be prevented from occurring in that the details of the highlight and the shadow become imperceptible due to insufficient gradation.

However, with the aforesaid shutting light technique and the aforesaid masking print techniques, the blocking sheet having been prepared regardless of the image, which is to be reproduced, must be operated. Therefore, a very high level of operation technique is required. Also, considerable labor and time are required to form the unsharp image film, and the printing efficiency cannot be kept high.

Also, with the aforesaid apparatuses described in Japanese Unexamined Patent Publication Nos. 58(1983)-66929 and 64(1989)-35542 and Japanese Patent Publication No. 64(1989)-10819, the contrast of a comparatively large structure can be reproduced by adjusting with the distribution of the luminance of the illuminating light source. However, local structures in the reproduced image correspond to the projected image of the original image film. Therefore, the aforesaid apparatuses have the drawbacks in that the reproduction of colors of the local structures, including their edges, cannot be controlled freely, in that the sharpness of the edges cannot be controlled freely, and in that the gradation of over-exposure portions, under-exposure portions, or the like, in the original image cannot be controlled freely. Further, with the aforesaid apparatuses described in Japanese Unexamined Patent Publication Nos. 58(1983)-66929 and 64(1989)-35542 and Japanese Patent Publication No. 64(1989)-10819, the processing for the photometric operation and the exposure is carried out sequentially. Therefore, the problems occur in that the processing capacity cannot be kept high. Also, the problems occur in that, in cases where the distance of movement of the original image becomes different between when the photometric operation is carried out and when the exposure is carried out, the printed image becomes disturbed. Further, with the apparatus described in Japanese Patent Publication No. 64(1989)-10819, wherein the liquid crystal is used, since the transmittance of the liquid crystal is at most approximately 30%, the exposure time cannot be kept short. Furthermore, the tube surface of the CRT is covered with glass, and the side inward from the glass becomes luminous. Therefore, even if the film is brought into close contact with the tube surface of the CRT, a spacing will substantially occur between the luminous surface of the CRT and the film. Accordingly, with the apparatus proposed in Japanese Unexamined Patent Publication No. 64(1989)-35542, wherein the image represented by the photometric signal is displayed, a blur occurs with the photometric and image forming system due to the spacing between the luminous surface of the CRT and the film surface during the photometric operation, and therefore a clear monitor image cannot be obtained.

With the method proposed in Japanese Unexamined Patent Publication No. 6(1994)-242521, even though the problems can be prevented from occurring in that the details of the highlight and the shadow become imperceptible due to insufficient gradation, the problems occur in that the contrast of each object becomes weak and the printed image becomes monotonous.

SUMMARY OF THE INVENTION

The primary object of the present invention is to provide an image reproducing method, wherein the details of a highlight and a shadow are prevented from becoming imperceptible in a printed image due to insufficient gradation, the printed image is prevented from becoming monotonous, and the printed image having good image quality is thereby obtained even from an original image having a strong contrast.

Another object of the present invention is to provide an image reproducing method, wherein the color reproducibility in a printed image is enhanced such that an unnatural feeling may not occur at portions in the vicinity of edges in the printed image, and wherein the printed image having good image quality is thereby obtained even from an original image having a strong contrast.

The specific object of the present invention is to provide an apparatus for carrying out the image reproducing method.

The present invention provides an image reproducing method, wherein a visible image is reproduced from a digital image signal representing a color image, the digital image signal being made up of a series of image signal components, the method comprising the steps of:

i) forming an unsharp image signal, which represents an unsharp image of the color image, ii) subtracting the image signal components of the digital image signal and the unsharp image signal from each other, which image signal components represent corresponding picture elements in the color image and the unsharp image, a difference signal being thereby obtained, iii) carrying out predetermined image processing on the difference signal, a processed image signal being thereby obtained, and iv) reproducing a visible image from the processed image signal.

The present invention also provides an image reproducing apparatus, wherein a visible image is reproduced from a digital image signal representing a color image, the digital image signal being made up of a series of image signal components, the apparatus comprising:

i) an unsharp image signal forming means for forming an unsharp image signal, which represents an unsharp image of the color image, ii) a subtraction means for subtracting the image signal components of the digital image signal and the unsharp image signal from each other, which image signal components represent corresponding picture elements in the color image and the unsharp image, a difference signal being thereby obtained, iii) an image processing means for carrying out predetermined image processing on the difference signal, a processed image signal being thereby obtained, and iv) an image reproducing means for reproducing a visible image from the processed image signal.

In the image reproducing method and apparatus in accordance with the present invention, the unsharp image signal should preferably be formed by converting the digital image signal into a brightness signal, and subjecting the brightness signal to filtering processing, or the like.

Alternatively, the unsharp image signal may be formed by photoelectrically reading out a projected image of the color image, which projected image is obtained by optically blurring the color image.

As another alternative, in cases where a pre-scanning operation is carried out in order to ascertain the obtained color image signal, the unsharp image signal may be formed by forming an unsharp signal of a thinned-out signal, which is obtained from the pre-scanning operation and in which the digital image signal has been thinned out at predetermined intervals, and interpolating signal components, which correspond to picture elements having been eliminated in the thinning-out operation, from the unsharp signal.

With the image reproducing method and apparatus in accordance with the present invention, the unsharp image signal of the digital image signal representing the color image is formed. The unsharp image signal represents only the structures of low frequencies in the color image. Therefore, in the difference signal obtained by subtracting the unsharp image signal from the digital image signal, the high frequency components in the image have approximately the same signal values as those in the digital image signal, and the low frequency components have signal values smaller than those in the digital image signal. The processing for changing the density, the saturation, and/or the gradation is carried out on the thus obtained difference signal. A visible image is then reproduced by the image reproducing means from the processed image signal, which has been obtained from the processing carried out on the difference signal.

In the image represented by the thus obtained difference signal, the contrast of the entire area of the image has been weakened, and the local contrast represented by the high frequency components is kept to be approximately equal to the contrast in the color image, which is the original image. Therefore, even if the contrast of the entire area of the original image is strong, the image reproduced from the processed image signal, which has been obtained from the processing carried out on the difference signal, will be obtained such that the contrast of the entire area of the image may be weakened, and such that the contrasts of fine structures in the highlight and the shadow may remain. Accordingly, the details of the highlight and the shadow can be prevented from becoming imperceptible in the printed image due to insufficient gradation, the printed image can be prevented from becoming monotonous, and the printed image having good image quality can thereby be obtained. For example, in cases where a picture is taken against the light, a printed image can be obtained such that both the details of a pattern of a person, which is located on the foreground side in the image, and the details of a background, which is located far away behind the pattern of the person, may be prevented from becoming imperceptible due to insufficient gradation.

Also, with the image reproducing method and apparatus in accordance with the present invention, the unsharp image signal may be formed by converting the digital image signal into the brightness signal, and subjecting the brightness signal to filtering processing, or the like. In such cases, the image reproduced from the processed image signal is obtained such that the color reproducibility may be kept good, even though the brightness at the edge of an object in the image may become different from the brightness in the color image. Therefore, an image can be obtained which is free from an unnatural feeling in comparison with the original color image.

Further, with the image reproducing method and apparatus in accordance with the present invention, the unsharp image signal may be formed by photoelectrically reading out a projected image of the color image, which projected image is obtained by optically blurring the color image. In such cases, a means for carrying out operations with an unsharp mask filter, or the like, need not be used, and the constitution of the apparatus can be kept simpler than in the technique for obtaining the unsharp image signal by carrying out the operations with the unsharp mask filter, or the like.

Furthermore, with the image reproducing method and apparatus in accordance with the present invention, wherein the pre-scanning operation is carried out in order to ascertain the obtained color image signal, the unsharp image signal may be formed by forming the unsharp signal of the thinned-out signal, which is obtained from the pre-scanning operation and in which the digital image signal has been thinned out at predetermined intervals, and interpolating signal components, which correspond to picture elements having been eliminated in the thinning-out operation, from the unsharp signal. In such cases, the unsharp image signal is formed by using the signal, which is obtained in the processing necessary for reproducing the visible image from the digital image signal representing the color image. Therefore, the image reproduction can be carried out efficiently.

BRIEF DESCRIPTION OF THE DRAWINGS

FIG. 6 is a perspective view showing an example of an image-wise exposure section and an example of a developing section.

DESCRIPTION OF THE PREFERRED EMBODIMENTS

The present invention will hereinbelow be described in further detail with reference to the accompanying drawings.

Figure 1:
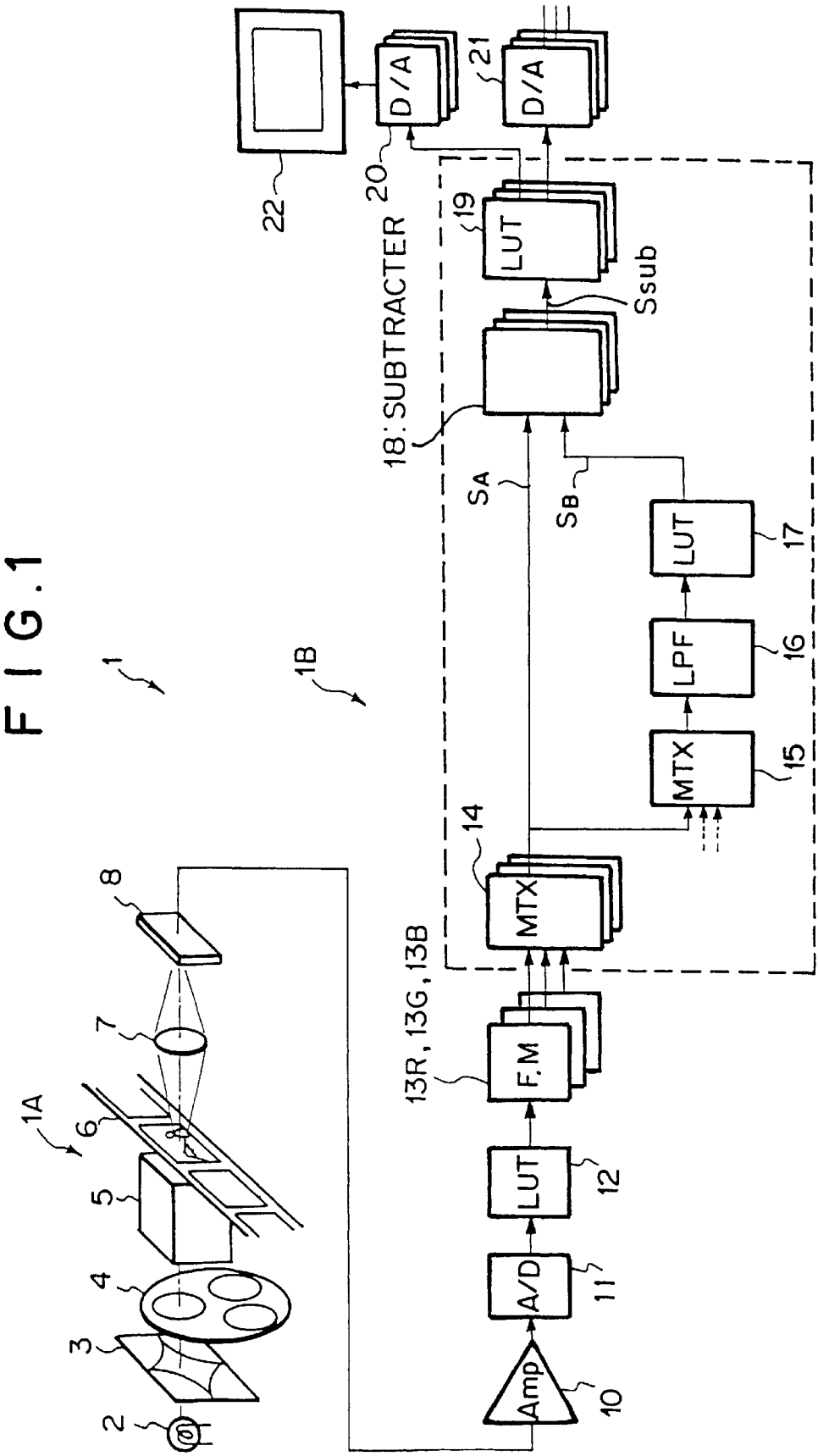
FIG. 1 is an explanatory view showing a first embodiment of the image reproducing apparatus in accordance with the present invention.

FIG. 1 is an explanatory view showing a first embodiment of the image reproducing apparatus in accordance with the present invention. As illustrated in FIG. 1, an image reproducing apparatus 1, which is the first embodiment of the image reproducing apparatus in accordance with the present invention, comprises an image read-out section 1A and an image processing section 1B. The image read-out section 1A comprises a light source 2, and a light regulator 3 for adjusting the amount of light having been produced by the light source 2. The image read-out section 1A also comprises an RGB filter 4 for converting the light, which has been produced by the light source 2, into R, G, and B three colors, and a mirror box 5 for diffusing the light, which has passed through the RGB filter 4, and irradiating it to film 6. The image read-out section 1A further comprises a lens 7 for forming an image of the light, which has passed through the film 6, on an area type of CCD 8. In this embodiment, the image read-out operation is carried out with the area type of CCD 8. Alternatively, a technique for moving a line sensor with respect to the light may be employed. As another alternative, a technique for spot photometry using a drum scanner, or the like, may be employed.

The image processing section 1B comprises an amplifier 10 for amplifying the R, G, and B three color image signals, which have been detected by the CCD 8, and an analog-to-digital converter 11 for converting the amplified image signals into digital image signals. The image processing section 1B also comprises a look-up table (LUT) 12 for converting the digital image signals into density signals, and frame memories 13R, 13G, and 13B, which respectively store the R, G, and B digital image signals having been converted into the density signals. The image processing section 1B further comprises a matrix (MTX) 14 for correcting the digital image signals such that they may become the color signals capable of being reproduced in appropriate colors on a photosensitive material, which will be described later. Digital image signals $S_A$ are obtained from the MTX 14. The image processing section 1B still further comprises an MTX 15 for converting the digital image signals $S_A$ into brightness signals, and a low-pass filter (LPF) 16 for forming unsharp signals from the brightness signals. The image processing section 1B also comprises an LUT 17 for adjusting the contrasts of the unsharp signals and thereby obtaining unsharp image signals $S_B$, and a subtractor 18 for subtracting the unsharp image signals $S_B$ from the corresponding digital image signals $S_A$ and thereby obtaining difference signals Ssub. The image processing section 1B further comprises an LUT 19 for correcting the contrasts of the difference signals Ssub and thereby obtaining signals S having been obtained from the contrast correction, and digital-to-analog converters 20 and 21 for converting the signals S into analog signals.

Figure 2:
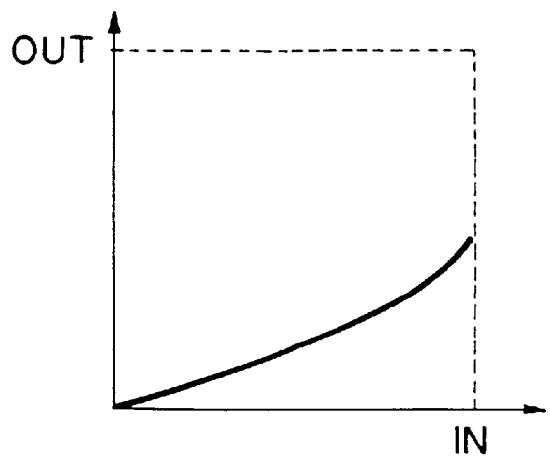
FIG. 2 is a graph showing the γ characteristics of an γ 17.
Figure 3:
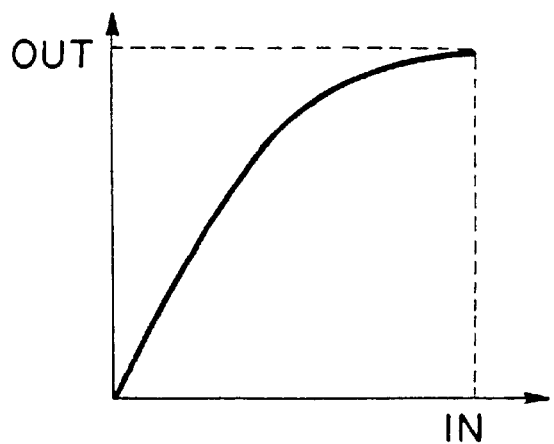
FIG. 3 is a graph showing the γ characteristics of an γ 19.

The LUT 17 stores table information giving a gradation curve illustrated in FIG. 2. Specifically, the LUT 17 has the γ characteristics, which are nonlinear such that the output signal value may become slightly large with respect to a large input signal value. The LUT 19 stores table information giving a gradation curve illustrated in FIG. 3. Specifically, the LUT 19 has the γ characteristics, which are nonlinear such that the output signal value may become small with respect to a large input signal value. The contrast of the processed image signal, which is obtained from a series of image processing carried out by the LUT 17 and the LUT 19, is determined in the manner described below. Specifically, the contrast of the large area of the entire image is determined by the value of 1−(γ of LUT 17), and the local contrast is determined by the value of {1−(γ of LUT 17)}×(γ of LUT 19). The γ value of the LUT 17 may be changed in accordance with the contrast of the large area of the entire image (e.g., as for a backlighted scene, the difference between the brightness of the background and the brightness of the primary object pattern). Experiments carried out by the inventor with respect to various kinds of scenes revealed that the local contrast should preferably be kept approximately at a predetermined level regardless of the contrast of the entire area of the image. Therefore, the LUT 19 should preferably be set in association with the LUT 17 such that the value of {1−(γ of LUT 17)}×(γ of LUT 19) may be approximately equal to a predetermined value. Accordingly, in this embodiment, the LUT 17 has the γ characteristics as illustrated in FIG. 2, and the LUT 19 has the γ characteristics as illustrated in FIG. 3, such that the value of {1−(γ of LUT 17)}×(γ of LUT 19) may be approximately equal to a predetermined value.

The MTX 14 corrects the detected digital image signals such that they may become the color signals capable of being reproduced in appropriate colors on the photosensitive material. Specifically, the MTX 14 corrects the detected digital image signals such that they may be reproduced in appropriate colors by the combination of the spectral characteristics of the film 6 and the spectral characteristics of the photosensitive material, on which the visible image is reproduced ultimately. The MTX 15 converts the R, G, and B color image signals into brightness signals. Specifically, the MTX 15 converts the R, G, and B color image signals into brightness signals by using a value of one-third of the mean value of each color image signal or by using the YIQ base, or the like.

Figure 4:
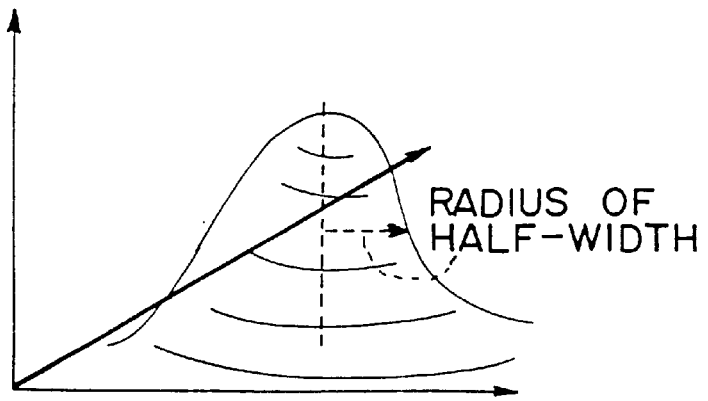
FIG. 4 is a graph showing the characteristics of a low-pass filter.

The LPF 16 is the unsharp mask filter for blurring the brightness signals in two-dimensional directions and has the characteristics illustrated in FIG. 4. If the diameter of the unsharp mask is very small, the sharpness will be emphasized unnaturally, or overshooting of an edge in the image will become perceptible. If the diameter of the unsharp mask is very large, the drawbacks will occur in that the effects of the unsharp mask cannot be obtained appropriately when the primary object pattern is small, or in that a large amount of calculation is required and the scale of the apparatus cannot be kept small. Experiments carried out by the inventor with respect to various kinds of scenes revealed that, as for the 135 film, the diameter of the half-width of the mask size should preferably fall within the range of approximately 0.3 mm to approximately 3 mm on the film, and should more preferably fall within the range of approximately 0.5 mm to approximately 2 mm on the film. In cases where the film size is larger than the 135 film, the unsharp mask size should preferably be increased.

The level of the saturation of the image signals, which are obtained from the series of the image processing, is determined by the value of (MTX 14)×{1−($\gamma$ of LUT 17)×(MTX 15)}×($\gamma$ of LUT 19). Therefore, the color reproducibility can be controlled freely by appropriately determining the factors of MTX and LUT in the formula shown above. Also, by the use of the MTX 15, which is constituted as the matrix for converting the color signals into the brightness signals, the unsharp mask can be operated, while the color reproducibility at the edge of an object is being kept appropriate, and the constitution of the circuit for carrying out the aforesaid operations can be kept simple.

Such that the color reproducibility on the print may be kept at a predetermined level when the value of $\gamma$ of the LUT 17 for controlling the level of the effects of the unsharp mask is changed for a given image, the value of the MTX 12 and/or the MTX 15 may be altered in association with each other such that the value of the formula shown above may become approximately equal to a predetermined value.

How the embodiment of the image reproducing apparatus in accordance with the present invention operates will be described hereinbelow with reference to FIGS. 1 and 5.

Figure 5A:
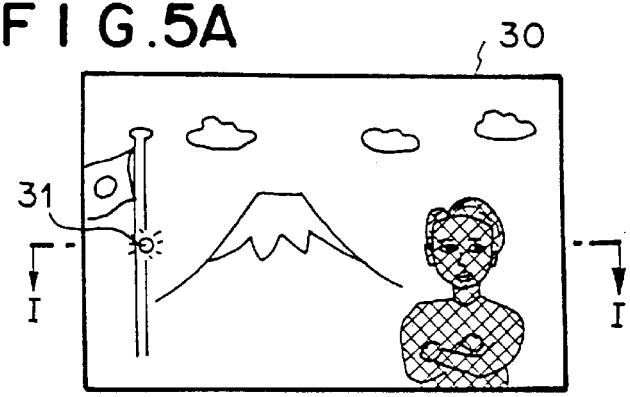
FIG. 5A is a schematic view showing an example of an original image.

Firstly, the light is produced by the light source 2 of the image read-out section 1A. The light is converted to a predetermined amount of light by the light regulator 3. By way of example, the amount of light, which has passed through the minimum density point in the image having been recorded on the film 6, is measured previously, and the light regulator 3 adjusts the amount of light having been produced by the light source 2 such that the amount of light, which has passed through the minimum density point in the image, may be slightly lower than the saturation level of the CCD 8. The light having been adjusted by the light regulating means 3 passes through the RGB filter 4, is diffused by the mirror box 5, and then impinges upon the film 6. The light passes through the film 6 and is thus modulated in accordance with the image information having been recorded on the film 6. Thereafter, the light passes through the lens 7 and impinges upon the CCD 8. In this manner, the light is photoelectrically converted by the CCD 8 into an image signal, which represents the image having been recorded on the film 6. In this embodiment, as illustrated in FIG. 5A, the image is a backlighted image 30, and a scene containing a catch light portion 31, from which the sunlight is reflected, is recorded on the film 6. The RGB filter 4 is changed over to R, G, and B, and three color image signals representing the color image are thereby obtained. The three color image signals are fed into the image processing section 1B. At the image processing section 1B, the processing is carried out in the manner described below.

The image signals obtained at the image read-out section 1A are weak, and are therefore amplified by the amplifier 10. The image signals are then converted into the digital image signals by the analog-to-digital converter 11. The digital image signals are converted into density signals by the LUT 12 and are then respectively stored in the frame memories 13R, 13G, and 13B.

Thereafter, the image signals are read from the frame memories 13R, 13G, and 13B and are subjected to color correction, which is carried out by the MTX 14. As described above, the MTX 14 corrects the digital image signals such that the colors may be reproduced by the combination of the spectral characteristics of the film 6 and the spectral characteristics of the photosensitive material, on which the visible image is reproduced ultimately. Digital image signals $S_A$ are obtained from the color correction carried out by the MTX 14 and are fed into the subtractor 18, which will later be described in detail.

Figure 5B:
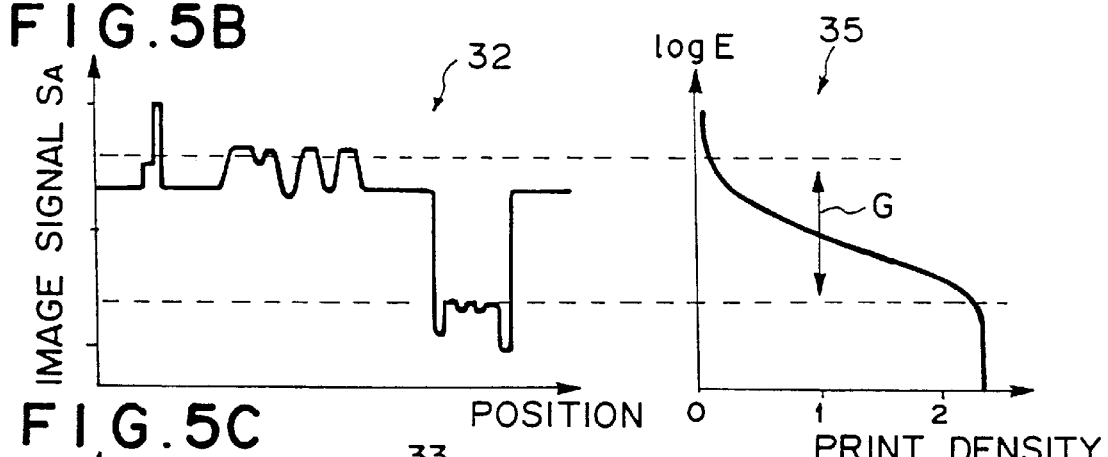
FIGS. 5B, 5C, and 5D are graphs serving as an aid in explaining how the processing is carried out in the image reproducing apparatus in accordance with the present invention.

FIG. 5B shows the profile of a signal 32, which is taken along line I—I of the image 30 shown in FIG. 5A. The signal 32 is fed as one of the digital image signals $S_A$ into the subtractor 18. The digital image signal $S_A$ and the ultimate print density have the relationship described below. Specifically, in a gradation curve 35 representing the relationship between the signal value and the print density, the region, in which the object pattern can be reproduced such that its details may not become imperceptible due to insufficient gradation, is a region G surrounded by the broken lines in FIG. 5B. However, the image signal components of the digital image signal $S_A$, which represent the catch light portion 31 and the pattern of the person, do not fall within the region G. Therefore, if the image is reproduced on the photosensitive material directly from the digital image signal $S_A$, the catch light portion 31 will become white and its details will become imperceptible. Also, the pattern of the person will become black and its details will become imperceptible. Thus the gray level of the portions of the image cannot be reproduced appropriately. Accordingly, in this embodiment, the processing described below is carried out such that the details of the very bright portion and the details of the very dark portion may not become imperceptible due to insufficient gradation in the print formed on the photosensitive material.

Firstly, the digital image signals $S_A$ are fed into the subtractor 18 and are also copied. The copied digital image signals $S_A$ are converted into the brightness signals by the MTX 15. As described above, the MTX 15 converts the R, G, and B color image signals into the brightness signals by using a value of one-third of the mean value of each color image signal or by using the YIQ base, or the like.

Figure 5C:
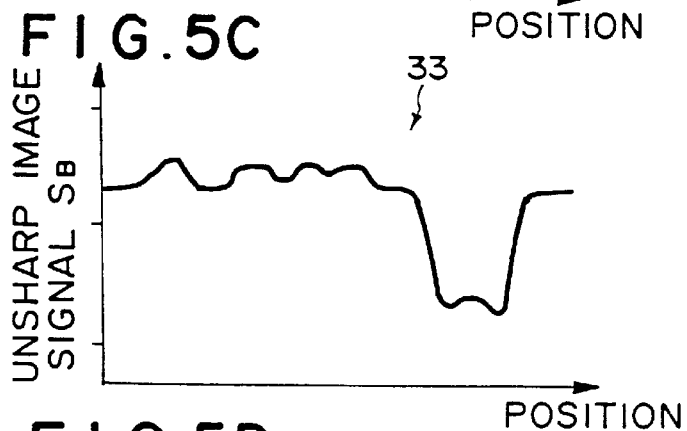

The brightness signals, which have thus been obtained, are then converted into the unsharp mask signals by the LPF 16. The unsharp mask signals are then subjected to the gradation conversion carried out by the LUT 17 and are thereby converted into the unsharp image signals $S_B$. FIG. 5C shows the profile of one of the unsharp image signals $S_B$. When the profile of the digital image signal $S_A$ shown in FIG. 5B and the profile of the unsharp image signal $S_B$ shown in FIG. 5C are compared with each other, it will be understood that the catch light portion and the pattern of the person, which are represented by the digital image signal $S_A$, are blurred in the unsharp image signal $S_B$. Specifically, the high frequency components of the digital image signal $S_A$ disappear in the unsharp image signal $S_B$, and the unsharp image signal $S_B$ is constituted of only the low frequency components.

Figure 5D:
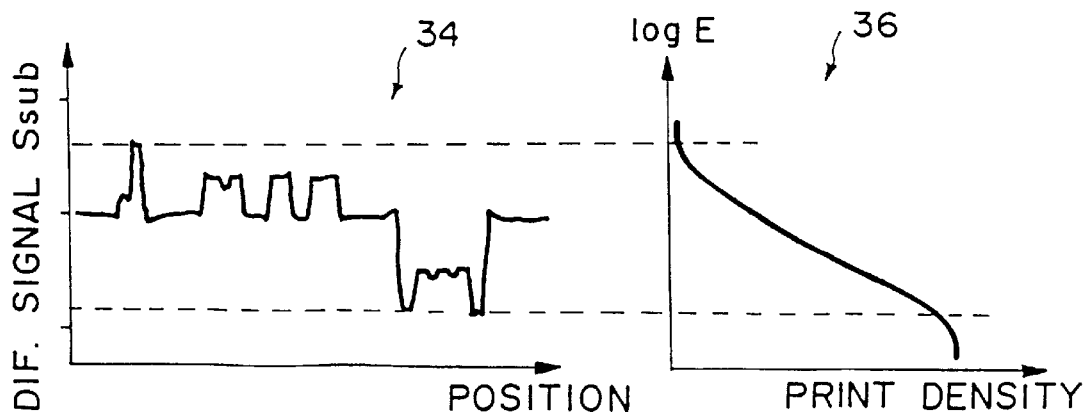

Thereafter, the subtractor 18 subtracts the unsharp image signals $S_B$ from the corresponding digital image signals $S_A$, and the difference signals Ssub are thereby obtained. FIG. 5D shows the profile of one of the difference signals Ssub. When the digital image signal $S_A$ shown in FIG. 5B and the difference signal Ssub shown in FIG. 5D are compared with each other, it will be understood that the signal range of the difference signal Ssub becomes narrow and falls within the region G such that the image signal components representing the catch light portion and the pattern of the person may also fall within the region G.

The thus obtained difference signals Ssub are subjected to gradation conversion, density conversion, or the like, which is carried out by the LUT 19. The difference signals Ssub are then converted into analog signals by the digital-to-analog converters 20 and 21. The analog signals obtained from the digital-to-analog converter 20 are fed into a monitor 22. A visible image is reproduced from the analog signals and is displayed on the monitor 22.

The analog signals obtained from the digital-to-analog converter 21 are fed into an image-wise exposure section 98 shown in FIG. 6. At the image-wise exposure section 98, the processing described below is carried out.

The image signals having been obtained from the image processing section 1B are fed into acousto-optic modulator (AOM) drivers (not shown). The AOM drivers operate AOM's 104R, 104G, and 104B of the image-wise exposure section 98 such that light beams may be modulated in accordance with the received image signals.

At the image-wise exposure section 98, a photosensitive material A is scanned with and exposed to light with the light beam scanning (raster scanning) technique, and an image represented by the image signals is thereby reproduced on the photosensitive material A. As illustrated in FIG. 6, the image-wise exposure section 98 comprises a light source 102R for producing a light beam having wavelengths of a narrow-band range corresponding to the exposure of a red-sensitive layer of the photosensitive material A, a light source 102G for producing a light beam having wavelengths of a narrow-band range corresponding to the exposure of a green-sensitive layer of the photosensitive material A, and a light source 102B for producing a light beam having wavelengths of a narrow-band range corresponding to the exposure of a blue-sensitive layer of the photosensitive material A. The image-wise exposure section 98 also comprises the AOM's 104R, 104G, and 104B for respectively modulating the light beams, which have been produced by the light sources 102R, 102G, and 102B, in accordance with the recorded image information. The image-wise exposure section 98 further comprises a rotating polygon mirror 96 serving as a light deflector, an fθ lens 106, and a sub-scanning conveyor 108 for conveying the photosensitive material A in a sub-scanning direction.

The light beams having been produced by the light sources 102R, 102G, and 102B travel along directions at different angles and impinge upon the corresponding AOM's 104R, 104G, and 104B. As the light sources 102R, 102G, and 102B, various types of light beam sources may be utilized, which are capable of producing the light beams having predetermined wavelengths corresponding to the sensitive layers of the photosensitive material A. For example, various types of semiconductor lasers, SHG lasers, or gas lasers, such as He-Ne lasers, may be used. Alternatively, the light sources may be constituted as a light beam combining optical system. The AOM's 104R, 104G, and 104B receive drive signals r, g, and b, which are for red, green, and blue colors and correspond to the recorded image information, from the AOM drivers. The AOM's 104R, 104G, and 104B thus modulate the intensities of the light beams, which impinge thereupon, in accordance with the recorded image information.

The light beams having been modulated by the AOM's 104R, 104G, and 104B impinge upon the rotating polygon mirror 96 serving as the light deflector and are reflected from it. The light beams are thus deflected in main scanning directions, which are indicated by the double headed arrow x in FIG. 6. Thereafter, the light beams are regulated by the fθ lens 106 such that they may be imaged in a predetermined beam shape at a predetermined scanning position z. The light beams thus impinge upon the photosensitive material A. In lieu of the rotating polygon mirror, a resonant scanner, a galvanometer mirror, or the like, may be utilized as the light deflector. Also, when necessary, the image-wise exposure section 98 may be provided with a light beam shaping means and an optical system for compensation for inclinations of the surfaces of the light deflector.

A roll of the photosensitive material A is located at a predetermined position such that it may be shielded from light. The photosensitive material A is delivered from the roll by a delivery unit, such as delivery rollers, and is cut to a predetermined length by a cutter (not shown). The sub-scanning conveyor 108 is constituted of a pair of rollers 108a, 108a and a pair of rollers 108b, 108b. The two pairs of rollers are located with the scanning position z intervening therebetween. The pair of rollers 108a, 108a and the pair of rollers 108b, 108b support the cut photosensitive material A at the scanning position z and convey it in the sub-scanning direction, which is approximately normal to the main scanning directions and is indicated by the arrow y in FIG. 6. As described above, the light beams are deflected in the main scanning directions. Therefore, the entire area of the photosensitive material A, which is being conveyed in the sub-scanning direction, is scanned with the light beams in the two-dimensional directions. In this manner, an image represented by the image signals, which have been processed by the LUT 19, is reproduced on the photosensitive material A.

The photosensitive material A, which has been exposed to the light beams, is then conveyed by a pair of conveying rollers 110, 110 into a developing section 100. At the developing section 100, the photosensitive material A is subjected to development processing, and a finished print P is thereby obtained. For example, in cases where the photosensitive material A is a silver halide photographic material, the developing section 100 is constituted of a color development tank 112, a bleach-fix tank 114, a washing tanks 116a, 116b, and 116c, and a drier 118. The photosensitive material A is subjected to predetermined processing in the respective processing tanks, and the finished print P is thereby obtained.

In the embodiment of FIG. 6, the light beams are modulated by the AOM's 104R, 104G, and 104B. Alternatively, in cases where light sources, such as LD's, which are capable of undergoing direct modulation, are utilized, the light beams may be directly modulated in accordance with the recorded image information. Also, in lieu of the two pairs of rollers, which are located with the scanning position intervening therebetween, a combination of an exposure drum, which supports the photosensitive material at the scanning position, and two nipping rollers, which are located with the scanning position intervening therebetween, may be utilized as the sub-scanning conveyor.

Further, in lieu of the light beam scanning described above, a drum scanner may be utilized. In cases where the drum scanner is employed, the photosensitive material is wound around a drum, and the light beams are caused to impinge upon a single point on the photosensitive material. Also, the drum is rotated and, at the same time, is moved along the axis of the drum. As another alternative, a surface exposure operation using a surface light source and a liquid crystal shutter may be employed. As a further alternative, the exposure operation may be carried out by using a linear light source, such as an LED array. Furthermore, in the embodiment of FIG. 6, the photosensitive material is cut into a sheet before being exposed to the light beams. Alternatively, the photosensitive material may be exposed to the light beams without being cut into sheets, and may be cut into sheets before being processed at the developing section 100 or after being processed at the developing section 100.

In the manner described above, the visible image is reproduced on the monitor 22 or at the developing section 100. Even if the visible image is the one reproduced from the backlighted scene shown in FIG. 5A, the details of the pattern of the person will not become imperceptible due to insufficient gradation in the visible image. Also, the details of the bright background pattern will not become imperceptible. Further, even if the visible image is the one reproduced from an image having been recorded by using an electronic flash, a visible reproduced image can be obtained such that both the details of a pattern of a person, which is located on the foreground side in the image, and the details of a background, which is located far away behind the pattern of the person, may be prevented from becoming imperceptible due to insufficient gradation.

In cases where a shutting light technique is carried out by controlling the distribution of the luminance of an illuminating light source, the selection of the factor of the MTX 15 is the only possible method for controlling the color reproducibility. Therefore, in cases where the color reproducibility is adjusted, both the brightness and the color reproducibility changes simultaneously at an edge in the image, and a print having an unnatural feeling is obtained. However, in the embodiment of the image reproducing apparatus in accordance with the present invention, the MTX 15 is constituted in order to convert the color image signals into the brightness signals. Therefore, with the embodiment of the image reproducing apparatus in accordance with the present invention, even though the brightness of an edge of an object changes, the color reproducibility at the edge does not change. Accordingly, a print having a natural feeling can be obtained.

Further, the LUT 17 and the LUT 19 have the nonlinear characteristics. Therefore, the gradation correction can be carried out also for the portions of nonlinear characteristics on the original image film (e.g., an over-exposure portion and an under-exposure portion).

Furthermore, in cases where a processing means for sharpness emphasis is added to the image reproducing apparatus, the local contrast of the image can be emphasized.

From the results of experiments carried out by the inventor, it was confirmed that, even if the shape of the LUT is not altered for each of the frames of the film 6, good finish quality with respect to the density can be obtained for approximately all of the frames. Specifically, in cases where a scene having an ordinary or weak contrast is processed under the y setting of the LUT having been determined with reference to a scene having a strong contrast, if the size of the LPF is large, the profiles of the unsharp image signals will become flat, and therefore an unnatural feeling will not occur in the print. As a result, with the image reproducing method in accordance with the present invention, a reproduced image having good quality can be obtained with a slight correcting operation. On the other hand, with a surface exposure system, it often occurs that, in order for a pattern of a primary object to be reproduced with an appropriate finish density, the exposure time determined from, for example, the mean density must be corrected largely in accordance with the difference between the mean density and the density of the primary object.

With the first embodiment of the image reproducing apparatus in accordance with the present invention, a pre-scanning operation need not be carried out, and the processing of the image signals can be carried out by carrying out only a single operation for reading out the image from the film 6. Therefore, the image processing can be carried out quickly. Also, since it is sufficient for a single image read-out operation to be carried out, it is not necessary for the film to be moved between the scanning operation and the exposure operation as in the apparatuses described in Japanese Unexamined Patent Publication Nos. 58(1983)-66929 and 64(1989)-35542 and Japanese Patent Publication No. 64(1989)-10819. Accordingly, no deviation occurs between the image signals and the mask signals due to an error occurring in the movement distance, and a reproduced image having good quality can be obtained reliably.

A second embodiment of the image reproducing apparatus in accordance with the present invention will be described hereinbelow.

Figure 7:
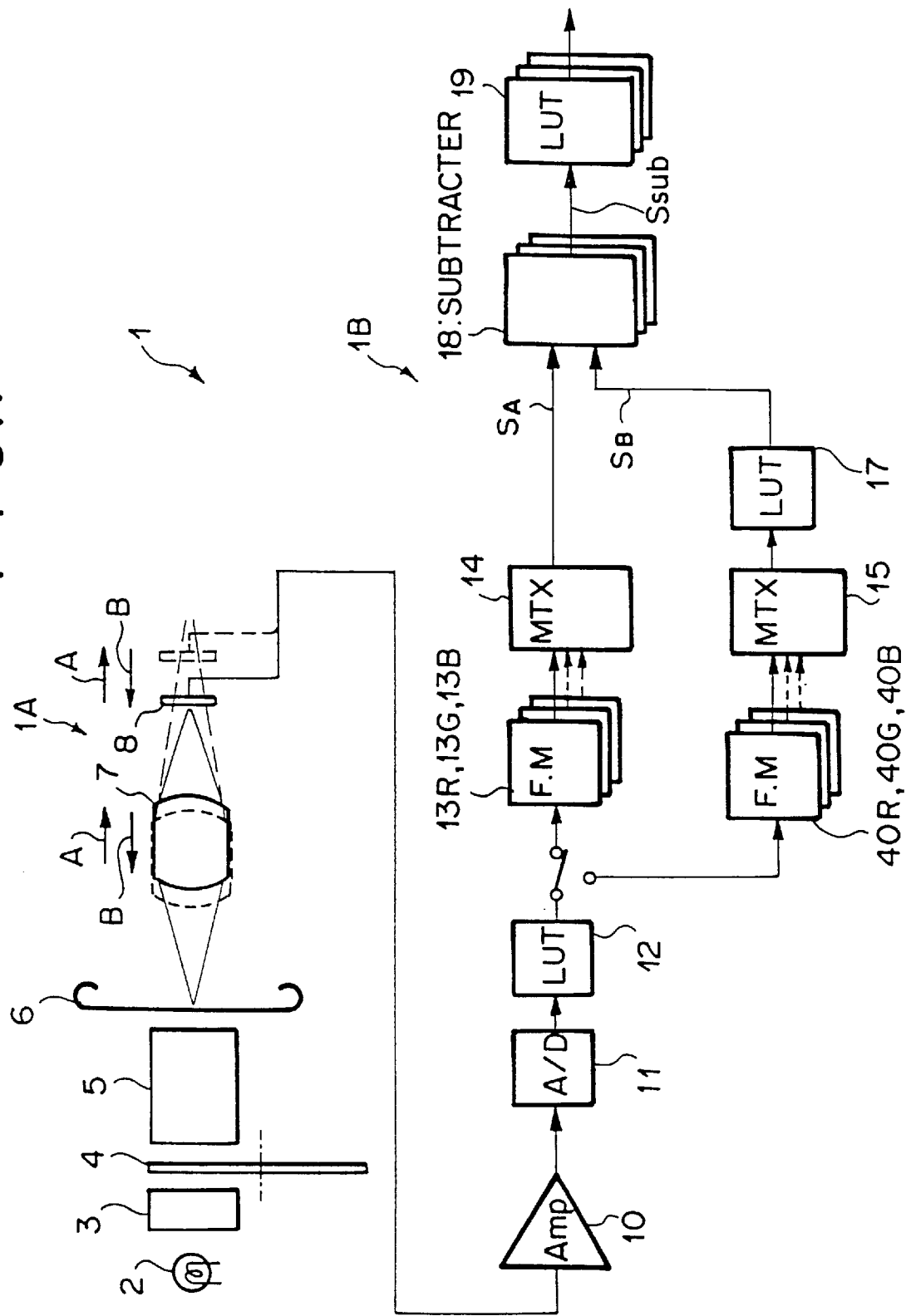
FIG. 7 is an explanatory view showing a second embodiment of the image reproducing apparatus in accordance with the present invention.

FIG. 7 is an explanatory view showing the second embodiment of the image reproducing apparatus in accordance with the present invention. As illustrated in FIG. 7, an image reproducing apparatus 1, which is the second embodiment of the image reproducing apparatus in accordance with the present invention, is similar to the image reproducing apparatus 1, which is the first embodiment shown in FIG. 1, except for the features described below. Specifically, in the image reproducing apparatus 1 of FIG. 7, the lens 7 and the CCD 8 can move along the optical axis direction. When the lens 7 and the CCD 8 are located at the positions indicated by the broken lines in FIG. 7, the light having passed through the film 6 is not imaged on the detection surface of the CCD 8. The image signals are obtained with the lens 7 and the CCD 8 located at the positions indicated by the solid lines in FIG. 7. The unsharp mask signals are obtained with the lens 7 and the CCD 8 located at the positions indicated by the broken lines in FIG. 7. The image signals and the unsharp mask signals are detected independently of each other from the film 6. Also, frame memories 40R, 40G, and 40B for storing the unsharp mask signals are provided independently of the frame memories 13R, 13G, and 13B for storing the digital image signals.

When the digital image signals are to be detected, the lens 7 and the CCD 8 are located at the positions indicated by the solid lines in FIG. 7. Also, as in the first embodiment described above, the light is produced by the light source 2 of the image read-out section 1A. The light is converted to a predetermined amount of light by the light regulator 3. The light having been adjusted by the light regulator 3 passes through the RGB filter 4, is diffused by the mirror box 5, and then impinges upon the film 6. The light passes through the film 6 and is thus modulated in accordance with the image information having been recorded on the film 6. Thereafter, the light passes through the lens 7 and impinges upon the CCD 8. In this manner, the light is photoelectrically converted by the CCD 8 into an image signal, which represents the image having been recorded on the film 6. The RGB filter 4 is changed over to R, G, and B, and three color image signals representing the color image are thereby obtained. The three color image signals are fed into the image processing section 1B. At the image processing section 1B, the processing is carried out in the manner described below.

The image signals obtained at the image read-out section 1A are amplified by the amplifier 10. The image signals are then converted into the digital image signals by the analog-to-digital converter 11. The digital image signals are converted into density signals by the LUT 12 and are then respectively stored in the frame memories 13R, 13G, and 13B.

Thereafter, the unsharp mask signals are detected. When the unsharp mask signals are to be detected, the lens 7 and the CCD 8 are located at the positions indicated by the broken lines in FIG. 7, such that the light having passed through the film 6 may not be imaged on the CCD 8. Also, as in the first embodiment described above, the light is produced by the light source 2 of the image read-out section 1A. The light is converted to a predetermined amount of light by the light regulator 3. The light having been adjusted by the light regulator 3 passes through the RGB filter 4, is diffused by the mirror box 5, and then impinges upon the film 6. The light passes through the film 6 and is thus modulated in accordance with the image information having been recorded on the film 6. Thereafter, the light passes through the lens 7 and impinges upon the CCD 8. In this manner, the light is photoelectrically converted by the CCD 8 into an unsharp image signal, which represents the image having been recorded on the film 6. The RGB filter 4 is changed over to R, G, and B, and three color unsharp mask signals representing the color image are thereby obtained. The unsharp mask signals are fed into the image processing section 1B. At the image processing section 1B, the unsharp mask signals are amplified by the amplifier 10 and are then converted into the digital unsharp mask signals by the analog-to-digital converter 11. Thereafter, the unsharp mask signals are converted into density signals by the LUT 12 and respectively stored in the frame memories 40R, 40G, and 40B.

Also, the digital image signals are read from the frame memories 13R, 13G, and 13B and are subjected to color correction, which is carried out by the MTX 14. The digital image signals $S_A$ having thus been obtained from the color correction are fed into the subtraction means 18. Further, the unsharp mask signals are read from the frame memories 40R, 40G, and 40B and converted into the brightness signals by the MTX 15. As described above, the MTX 15 converts the R, G, and B color unsharp mask signals into the brightness signals by using a value of one-third of the mean value of each color unsharp mask signal or by using the YIQ base, or the like. The brightness signals are subjected to gradation conversion, which is carried out by the LUT 17, and the unsharp image signals $S_B$ are thereby obtained. The unsharp image signals $S_B$ are fed into the subtraction means 18.

Thereafter, the subtraction means 18 subtracts the unsharp image signals $S_B$ from the corresponding digital image signals $S_A$, and the difference signals Ssub are thereby obtained. The thus obtained difference signals Ssub are subjected to gradation conversion, which is carried out by the LUT 19. The difference signals Ssub are then converted into analog signals by the digital-to-analog converters 20 and 21. The analog signals obtained from the digital-to-analog converter 20 are fed into the monitor 22. A visible image is reproduced from the analog signals and is displayed on the monitor 22. Also, the analog signals obtained from the digital-to-analog converter 21 are fed into the image-wise exposure section 98 shown in FIG. 6 and used for reproducing a visible image on the photosensitive material. A print is thus obtained at the developing section 100 shown in FIG. 6.

In the second embodiment, instead of the unsharp image signals being obtained from calculations, the unsharp image signals are obtained by photoelectrically reading out the image, which is projected from the film 6 and is blurred optically. Therefore, an unsharp mask filter requiring a large-scale circuit constitution need not be used, and the constitution of the apparatus can be kept simple. Also, as in the first embodiment, a reproduced image having an image quality sufficiently appropriate for practical use can be obtained.

A third embodiment of the image reproducing apparatus in accordance with the present invention will be described hereinbelow.

Figure 8:
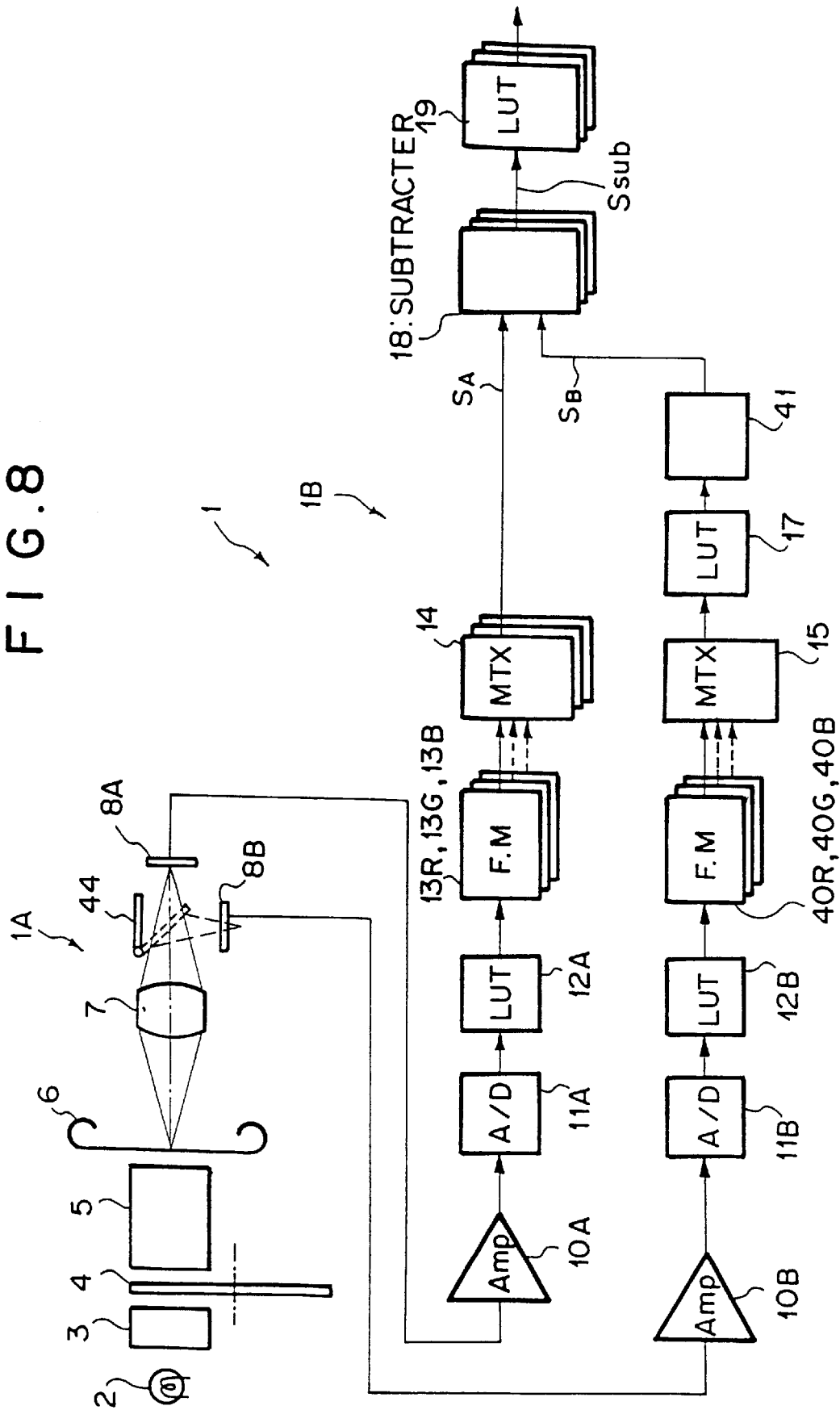
FIG. 8 is an explanatory view showing a third embodiment of the image reproducing apparatus in accordance with the present invention.

FIG. 8 is an explanatory view showing the third embodiment of the image reproducing apparatus in accordance with the present invention. As illustrated in FIG. 8, an image reproducing apparatus 1, which is the third embodiment of the image reproducing apparatus in accordance with the present invention, is similar to the image reproducing apparatus 1, which is the first embodiment shown in FIG. 1, except for the features described below. Specifically, in the image reproducing apparatus 1 of FIG. 8, a change-over mirror 44 is located in the optical path of the light, which has passed through the film 6, in order to change over the direction of the optical path. Also, the light traveling without being reflected by the change-over mirror 44 is received by a CCD 8A, and the light traveling by being reflected by the change-over mirror 44 is received by a CCD 8B. The light impinging upon the CCD 8B is not imaged on the detection surface of the CCD 8B. The CCD 8A is associated with an amplifier 10A, an analog-to-digital converter 11A, an LUT 12A, and the frame memories 13R, 13G, and 13B. Also, the CCD 8B is associated with an amplifier 10B, an analog-to-digital converter 11B, an LUT 12B, and frame memories 40R, 40G, and 40B.

When the digital image signals are to be detected, the change-over mirror 44 is located at the position indicated by the solid line in FIG. 8. Also, as in the first embodiment described above, the light is produced by the light source 2 of the image read-out section 1A. The light is converted to a predetermined amount of light by the light regulating means 3. The light having been adjusted by the light regulating means 3 passes through the RGB filter 4, is diffused by the mirror box 5, and then impinges upon the film 6. The light passes through the film 6 and is thus modulated in accordance with the image information having been recorded on the film 6. Thereafter, the light passes through the lens 7 and impinges upon the CCD 8A. In this manner, the light is photoelectrically converted by the CCD 8A into an image signal, which represents the image having been recorded on the film 6. The RGB filter 4 is changed over to R, G, and B, and three color image signals representing the color image are thereby obtained. The three color image signals are fed into the image processing section 1B. At the image processing section 1B, the processing is carried out in the manner described below.

The image signals obtained at the image read-out section 1A are amplified by the amplifier 10A. The image signals are then converted into the digital image signals by the analog-to-digital converter 11A. The digital image signals are converted into density signals by the LUT 12A and are then respectively stored in the frame memories 13R, 13G, and 13B.

Thereafter, the unsharp mask signals are detected. When the unsharp mask signals are to be detected, the change-over mirror 44 is located at the position indicated by the broken line in FIG. 8. Also, as in the first embodiment described above, the light is produced by the light source 2 of the image read-out section 1A. The light is converted to a predetermined amount of light by the light regulator 3. The light having been adjusted by the light regulator 3 passes through the RGB filter 4, is diffused by the mirror box 5, and then impinges upon the film 6. The light passes through the film 6 and is thus modulated in accordance with the image information having been recorded on the film 6. Thereafter, the light passes through the lens 7 and impinges upon the CCD 8B. In this manner, the light is photoelectrically converted by the CCD 8B into an unsharp image signal, which represents the image having been recorded on the film 6. The RGB filter 4 is changed over to R, G, and B, and three color unsharp mask signals representing the color image are thereby obtained. The unsharp mask signals are fed into the image processing section 1B. At the image processing section 1B, the unsharp mask signals are amplified by the amplifier 10B and are then converted into the digital unsharp mask signals by the analog-to-digital converter 11B. Thereafter, the unsharp mask signals are converted into density signals by the LUT 12B and respectively stored in the frame memories 40R, 40G, and 40B.

Also, the digital image signals are read from the frame memories 13R, 13G, and 13B and are subjected to color correction, which is carried out by the MTX 14. The digital image signals $S_A$ having thus been obtained from the color correction are fed into the subtractor 18. Further, the unsharp mask signals are read from the frame memories 40R, 40G, and 40B and converted into the brightness signals by the MTX 15. As described above, the MTX 15 converts the R, G, and B color unsharp mask signals into the brightness signals by using a value of one-third of the mean value of each color unsharp mask signal or by using the YIQ base, or the like. The brightness signals are subjected to gradation conversion, which is carried out by the LUT 17, and the unsharp image signals $S_B$ are thereby obtained. The unsharp image signals $S_B$ are fed into the subtraction means 18.

Thereafter, the subtraction means 18 subtracts the unsharp image signals $S_B$ from the corresponding digital image signals $S_A$, and the difference signals Ssub are thereby obtained. The thus obtained difference signals Ssub are subjected to gradation conversion, which is carried out by the LUT 19. The difference signals Ssub are then converted into analog signals by the digital-to-analog converters 20 and 21. The analog signals obtained from the digital-to-analog converter 20 are fed into the monitor 22. A visible image is reproduced from the analog signals and is displayed on the monitor 22. Also, the analog signals obtained from the digital-to-analog converter 21 are fed into the image-wise exposure section 98 shown in FIG. 6 and used for reproducing a visible image on the photosensitive material. A print is thus obtained at the developing section 100 shown in FIG. 6.

In the third embodiment, instead of the unsharp image signals being obtained from calculations, the unsharp image signals are obtained by photoelectrically reading out the image, which is projected from the film 6 and is blurred optically. Therefore, an unsharp mask filter requiring a large-scale circuit constitution need not be used, and the constitution of the apparatus can be kept simple. Also, as in the first embodiment, a reproduced image having an image quality sufficiently appropriate for practical use can be obtained.

When the third embodiment of FIG. 8 is compared with the second embodiment of FIG. 7, the third embodiment has the features described below. Specifically, the CCD 8B for detecting the unsharp image signals can be constituted of a CCD, which is constituted of a small number of picture elements and is cheap. Therefore, the frame memories 40R, 40G, and 40B for storing the signals obtained from the CCD 8B can be constituted of frame memories having a small capacity. Accordingly, the constitution of the apparatus can be kept simple, and a reproduced image having an image quality sufficiently appropriate for practical use can be obtained quickly. In such cases, it is necessary for an interpolator 41 to be located after the LUT 17 in order to adjust the picture element density of the unsharp image signals $S_B$ such that it may coincide with the picture element density of the digital image signals $S_A$.

A fourth embodiment of the image reproducing apparatus in accordance with the present invention will be described hereinbelow.

Figure 9:
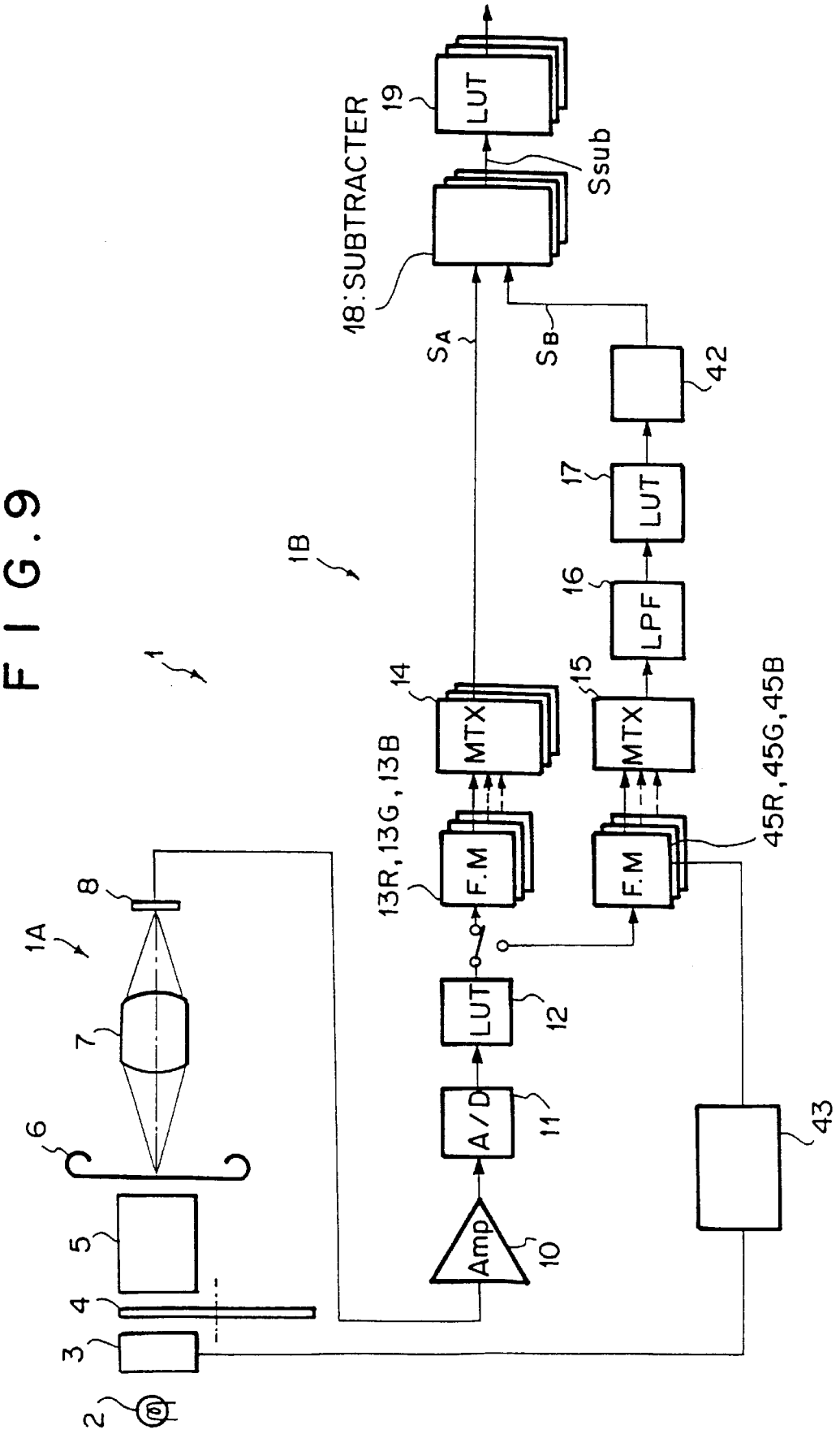
FIG. 9 is an explanatory view showing a fourth embodiment of the image reproducing apparatus in accordance with the present invention.

FIG. 9 is an explanatory view showing the fourth embodiment of the image reproducing apparatus in accordance with the present invention. As illustrated in FIG. 9, in an image reproducing apparatus 1, which is the fourth embodiment of the image reproducing apparatus in accordance with the present invention, a pre-scanning operation is carried out in order to coarsely read out the image, which has been recorded on the film 6, at predetermined picture element intervals. Thereafter, a fine scanning operation is carried out in order to read out the image, which has been recorded on the film 6, at finer picture element intervals and in accordance with the information obtained from the pre-scanning operation. The image reproducing apparatus 1 shown in FIG. 9 is similar to the image reproducing apparatus 1, which is the first embodiment shown in FIG. 1, except that the image reproducing apparatus 1 shown in FIG. 9 is further provided with pre-scanning frame memories 45R, 45G, and 45B for storing the signals obtained from the pre-scanning operation, a light regulator controller 43 for controlling the light regulator 3 in accordance with the signals obtained from the pre-scanning operation, and an interpolator 42 for interpolating signal components from the signals obtained from the pre-scanning operation.

In the fourth embodiment, the pre-scanning operation is carried out firstly. The pre-scanning operation is carried out in the manner described below. Specifically, the light is produced by the light source 2 of the image read-out section 1A. The light is converted to a predetermined amount of light by the light regulator 3. The light having been adjusted by the light regulator 3 passes through the RGB filter 4, is diffused by the mirror box 5, and then impinges upon the film 6. The light passes through the film 6 and is thus modulated in accordance with the image information having been recorded on the film 6. Thereafter, the light passes through the lens 7 and impinges upon the CCD 8. In this manner, the light is photoelectrically converted by the CCD 8 into an image signal. At this time, instead of all of the picture elements on the CCD 8 being used, for example, only the picture elements at every second row and every second column in the array of picture elements are used. The RGB filter 4 is changed over to R, G, and B, and three color pre-scanning signals representing the color image are thereby obtained. The three color pre-scanning signals are fed into the image processing section 1B. At the image processing section 1B, the pre-scanning signals are amplified by the amplifier 10 and converted into digital pre-scanning signals by the analog-to-digital converter 11. The digital pre-scanning signals are converted into density signals by the LUT 12 and are then respectively stored in the pre-scanning frame memories 45R, 45G, and 45B.

Thereafter, the light regulator controller 43 reads the pre-scanning signals from the pre-scanning frame memories 45R, 45G, and 45B and controls the light regulator 3 during the fine scanning operation in accordance with the values of the pre-scanning signals. In this manner, the amount of light having been produced by the light source 2 is adjusted. Specifically, in cases where the signal values obtained from the pre-scanning operation are comparatively large, the amount of light irradiated to the film 6 during the fine-scanning operation is set to be comparatively small, such that the density of the ultimately obtained image may not become very high. Also, in cases where the signal values obtained from the pre-scanning operation are comparatively small, the amount of light irradiated to the film 6 during the fine-scanning operation is set to be comparatively large, such that the density of the ultimately obtained image may not become very low.

In the manner described above, the light regulator 3 is controlled in accordance with the pre-scanning signals. Thereafter, the fine scanning operation is carried out in the manner described below.

Specifically, as in the pre-scanning operation, the light is produced by the light source 2 of the image read-out section 1A. The light is converted to a predetermined amount of light by the light regulator 3. The predetermined amount of light is set in accordance with the pre-scanning signals obtained from the pre-scanning operation. The light having been adjusted by the light regulator 3 passes through the RGB filter 4, is diffused by the mirror box 5, and then impinges upon the film 6. The light passes through the film 6 and is thus modulated in accordance with the image information having been recorded on the film 6. Thereafter, the light passes through the lens 7 and impinges upon the CCD 8. In this manner, the light is photoelectrically converted by the CCD 8 into an image signal, which represents the image having been recorded on the film 6. At this time, the light having passed through the film 6 is photoelectrically detected by using all of the picture elements on the CCD 8. The RGB filter 4 is changed over to R, G, and B, and three color image signals representing the color image are thereby obtained. The three color image signals are fed into the image processing section 1B. At the image processing section 1B, the processing is carried out in the manner described below.

The image signals obtained at the image read-out section 1A are amplified by the amplifier 10. The image signals are then converted into the digital image signals by the analog-to-digital converter 11. The digital image signals are converted into density signals by the LUT 12 and are then respectively stored in the frame memories 13R, 13G, and 13B.

Thereafter, the digital image signals are read from the frame memories 13R, 13G, and 13B and are subjected to color correction, which is carried out by the MTX 14. The digital image signals $S_A$ having thus been obtained from the color correction are fed into the subtractor 18.

Further, the pre-scanning signals are read from the pre-scanning frame memories 45R, 45G, and 45B and converted into the brightness signals by the MTX 15. As described above, the MTX 15 converts the R, G, and B color pre-scanning signals into the brightness signals by using a value of one-third of the mean value of each color pre-scanning signal or by using the YIQ base, or the like. The thus obtained brightness signals are converted into the unsharp mask signals by the LPF 16. The unsharp mask signals are subjected to gradation conversion, which is carried out by the LUT 17, and are then fed into the interpolator 42. In the interpolator 42, signal components corresponding to the picture elements omitted in the pre-scanning operation are interpolated from the signal components of each unsharp mask signal, which correspond to the picture elements adjacent to the omitted picture elements. In this manner, the unsharp image signals $S_B$ are obtained. The unsharp image signals $S_B$ are fed into the subtractor 18.

Thereafter, the subtractor 18 subtracts the unsharp image signals $S_B$ from the corresponding digital image signals $S_A$, and the difference signals Ssub are thereby obtained. The thus obtained difference signals Ssub are subjected to gradation conversion, which is carried out by the LUT 19. The difference signals Ssub are then converted into analog signals by the digital-to-analog converters 20 and 21. The analog signals obtained from the digital-to-analog converter 20 are fed into the monitor 22. A visible image is reproduced from the analog signals and is displayed on the monitor 22. Also, the analog signals obtained from the digital-to-analog converter 21 are fed into the image-wise exposure section 98 shown in FIG. 6 and used for reproducing a visible image on the photosensitive material. A print is thus obtained at the developing section 100 shown in FIG. 6.

In the fourth embodiment, the unsharp image signals are obtained from the pre-scanning signals, which have been detected with respect to a small number of picture elements. Therefore, an unsharp mask filter requiring a large-scale circuit constitution need not be used, and the constitution of the apparatus can be kept simple. Also, as in the first embodiment, a reproduced image having an image quality sufficiently appropriate for practical use can be obtained.

Also, the unsharp image signals are obtained from the pre-scanning signals, which are necessary for adjusting the light regulating means 3. Therefore, a particular operation for scanning the film 6 in order to obtain the unsharp image signals need not be carried out. Accordingly, the time required to carry out the processing can be kept short, and the image reproduction can be carried out efficiently.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image reproducing method, wherein a visible image is reproduced from a digital image signal representing a color image, the digital image signal being made up of a series of image signal components, the method comprising the steps of:

i) forming an unsharp image signal, which represents an unsharp image of the color image by, optically blurring the color image to form a blurred image by moving the focal plane of the image signal to a point displaced from the plane of an imaging device to thereby defocus the detected image, and photoelectrically reading out the output of the imaging device as the blurred image to form the unsharp image signal;

ii) narrowing a signal range of the digital image signal by coupling the image signal components of the digital image signal and said unsharp image signal with one another, which image signal components represent corresponding picture elements in the color image and said unsharp image, a narrowed signal being thereby obtained;

iii) carrying out predetermined image processing only on said narrowed signal, a processed image signal having a narrowed signal range being thereby obtained; and iv) reproducing a visible image from said processed image signal.

2. A method as defined in claim 1, wherein said step ii) of narrowing the signal range includes subtracting said unsharp image signal from said image signal components of the digital image signal.

3. The method as defined in claim 1, wherein said substep of optically blurring moves at least one of a focus lens and an imaging device to defocus the image on the imaging device.

4. The method as defined in claim 1 wherein first and second imaging devices are used, said substep of optically blurring switching the optical path between the first imaging device on which the image signal is focussed and a second imaging device having an optical plane, where the image signal, when switched to said second optical signal, is focussed away from the optical plane of said second imaging device to defocus the image signal as received on said imaging device.

5. An image reproducing apparatus, wherein a visible image is reproduced from a digital image signal representing a color image, the digital image signal being made up of a series of image signal components, the apparatus comprising:

unsharp image signal forming means for forming an unsharp image signal, which represents an unsharp image of the color image, said unsharp image signal forming means including, means for optically blurring the color image to form an unsharp image, said means for optically blurring moving the focal plane of the image signal to a point displaced from the plane of an imaging device to thereby defocus the detected image, and means for photoelectrically reading out the unsharp image from the imaging device to thereby form said unsharp image signal;

a narrower for narrowing a signal range of the digital image signal including coupling means for coupling the image signal components of the digital image signal and said unsharp image signal with one another, which image signal components represent corresponding picture elements in the color image and said unsharp image, a narrowed signal being thereby obtained;

an image processor for carrying out predetermined image processing only on said narrowed signal, a processed image signal having a narrowed signal range being thereby obtained; and an image reproducing means for reproducing a visible image from said processed image signal.

6. An apparatus as defined in claim 5, wherein said narrower includes a subtractor subtracting said unsharp image signal from said digital image signal.

7. The apparatus as defined in claim 5, wherein said means for optically blurring moves at least one of a focus lens and an imaging device to defocus the image on the imaging device.

8. The apparatus as defined in claim 5, said apparatus including first and second imaging devices, said means for optically blurring switching the optical path between the first imaging device on which the image signal is focussed and a second imaging device having an optical plane, where the image signal, when switched to said second optical signal, is focussed by said means for optically blurring away from the optical plane of said second imaging device to defocus the image signal as received on said imaging device.

9. An image reproducing method, wherein a visible image is reproduced from a digital image signal representing a color image, the digital image signal being made up of a series of image signal components, the method comprising the steps of:

i) pre-scanning the visible image with a first lower image resolution to form an unsharp image signal, which represents an unsharp image of the color image;

ii) fine scanning the visible image with a second higher image resolution to produce a full resolution digital image signal of the visible image;

iii) narrowing a signal range of the full resolution digital image signal by coupling the image signal components of the digital image signal and said unsharp image signal with one another, which image signal components represent corresponding picture elements in the color image and said unsharp image, a narrowed signal being thereby obtained;

iv) carrying out predetermined image processing only on said narrowed signal, a processed image signal having a narrowed signal range being thereby obtained; and v) reproducing a visible image from said processed image signal.

10. A method as defined in claim 9, wherein said step ii) of fine scanning further includes controlling conditions during said fine scanning in accordance with signal values obtained during said step i) of pre-scanning.

11. An image reproducing apparatus, wherein a visible image is reproduced from a digital image signal representing a color image, the digital image signal being made up of a series of image signal components, the apparatus comprising:

a image sensor for scanning the visible image to be reproduced;

a pre-scanning circuit for storing an electronic signal of said visible image obtained from said image sensor and for developing a lower resolution prescan image signal as an unsharp image signal which represents an unsharp image of the color image;

fine scanning circuit for fine scanning the visible image with a second higher image resolution to produce a full resolution digital image signal of the visible image;

a narrower for narrowing a signal range of the full resolution digital image signal including a coupler for coupling the image signal components of the digital image signal and said unsharp image signal with one another, which image signal components represent corresponding picture elements in the color image and said unsharp image, a narrowed signal being thereby obtained;

an image processor for carrying out predetermined image processing only on said narrowed signal, a processed image signal having a narrowed signal range being thereby obtained; and an image reproducing means for reproducing a visible image from said processed image signal.

12. An apparatus as defined in claim 11, further comprising means for controlling conditions during said fine scanning in accordance with signal values obtained during said pre-scanning.

* * * * *